United States Patent
Featonby et al.

(10) Patent No.: US 11,892,418 B1
(45) Date of Patent: Feb. 6, 2024

(54) CONTAINER IMAGE INSPECTION AND OPTIMIZATION

(71) Applicant: Amazon Technologies, Inc., Seattle, WA (US)

(72) Inventors: Malcolm Featonby, Sammamish, WA (US); Sravan Rengarajan, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 297 days.

(21) Appl. No.: 17/305,141

(22) Filed: Jun. 30, 2021

(51) Int. Cl.
*G01N 21/90* (2006.01)

(52) U.S. Cl.
CPC ..... *G01N 21/9009* (2013.01); *G01N 21/9036* (2013.01)

(58) Field of Classification Search
CPC .......... G06F 21/53; G06F 21/51; G06F 21/54; G06F 2221/033; G06F 9/5016; G06F 9/545; G06F 9/5077; G06F 9/4843; H04L 63/1425; H04L 63/1433; H04L 63/1416; G01N 21/9009; G01N 21/9036
See application file for complete search history.

(56) References Cited

U.S. PATENT DOCUMENTS

| | | | |
|---|---|---|---|
| 9,256,467 B1 | 2/2016 | Singh et al. | |
| 9,549,038 B1 | 1/2017 | Anne | |
| 9,910,713 B2 | 3/2018 | Wisniewski et al. | |
| 10,067,801 B1 | 9/2018 | Wagner | |
| 10,397,255 B1* | 8/2019 | Bhalotra | H04L 63/1425 |
| 10,432,551 B1 | 10/2019 | Vosshall et al. | |
| 10,606,646 B1* | 3/2020 | Christensen | G06F 9/5016 |
| 10,606,660 B1 | 3/2020 | Hartley et al. | |
| 10,771,337 B1 | 9/2020 | Das et al. | |
| 10,824,474 B1 | 11/2020 | Kamboj et al. | |
| 10,871,995 B2 | 12/2020 | Gerdesmeier et al. | |
| 2012/0210326 A1 | 8/2012 | Torr et al. | |
| 2013/0160008 A1 | 6/2013 | Cawlfield et al. | |
| 2014/0358710 A1 | 12/2014 | Balestrieri et al. | |
| 2015/0142878 A1 | 5/2015 | Hebert et al. | |
| 2016/0077846 A1 | 3/2016 | Phillips et al. | |

(Continued)

OTHER PUBLICATIONS

U.S. Appl. No. 16/217,454, filed Dec. 12, 2018, Aithal et al.

(Continued)

*Primary Examiner* — Sang H Nguyen
(74) *Attorney, Agent, or Firm* — Knobbe, Martens, Olson & Bear LLP

(57) ABSTRACT

Provided is a system for inspecting and optimizing containerized software applications. A container image may include a plurality of files and layers, and some of such files and layers may not be used during the execution of the container image. A system described herein can identify and remove such unused files and/or layers from the container image by launching an inspector task configured to launch the container image, monitor access to the files in the container image, identify which files are unused, and remove the unused files from the container image (or generate a new container image not including the unused files). By doing so, the system can reduce the size of the container image, which can reduce the storage costs, startup latency, and security vulnerabilities associated with the container image.

20 Claims, 8 Drawing Sheets

(56) References Cited

U.S. PATENT DOCUMENTS

| | | |
|---|---|---|
| 2016/0274928 A1* | 9/2016 | Linton ................ G06F 9/45558 |
| 2016/0378559 A1 | 12/2016 | Bhandarkar et al. |
| 2017/0078433 A1 | 3/2017 | Radhakrishnan et al. |
| 2017/0140526 A1* | 5/2017 | Chen .................... G06Q 30/018 |
| 2017/0177860 A1 | 6/2017 | Suarez et al. |
| 2017/0339158 A1 | 11/2017 | Lewis et al. |
| 2017/0339196 A1 | 11/2017 | Lewis et al. |
| 2018/0088993 A1 | 3/2018 | Gerdesmeier et al. |
| 2018/0101403 A1 | 4/2018 | Baldini Soares et al. |
| 2018/0129539 A1 | 5/2018 | Sadat |
| 2018/0246745 A1 | 8/2018 | Aronovich et al. |
| 2018/0278639 A1* | 9/2018 | Bernstein ................ G06F 21/53 |
| 2018/0331971 A1 | 11/2018 | Certain et al. |
| 2018/0336345 A1* | 11/2018 | Georgiev ................ G06F 9/455 |
| 2019/0108049 A1 | 4/2019 | Singh et al. |
| 2019/0146772 A1* | 5/2019 | Griffin ...................... G06F 8/71 717/121 |
| 2019/0294477 A1 | 9/2019 | Koppes et al. |
| 2019/0324786 A1 | 10/2019 | Ranjan et al. |
| 2020/0051017 A1* | 2/2020 | Dujmic ................ G06V 30/424 |
| 2020/0073649 A1 | 3/2020 | Viana et al. |
| 2020/0142711 A1 | 5/2020 | Varda et al. |
| 2020/0174842 A1 | 6/2020 | Wang et al. |
| 2020/0213279 A1 | 7/2020 | Xiong et al. |
| 2020/0241930 A1 | 7/2020 | Garg et al. |
| 2020/0249977 A1 | 8/2020 | Mentz et al. |
| 2020/0310845 A1 | 10/2020 | Liguori et al. |
| 2020/0310850 A1 | 10/2020 | Liguori et al. |
| 2020/0358719 A1 | 11/2020 | Mestery et al. |
| 2020/0412596 A1 | 12/2020 | Cherunni |
| 2021/0089361 A1 | 3/2021 | Rafey et al. |
| 2021/0109775 A1 | 4/2021 | Shen et al. |
| 2021/0117217 A1 | 4/2021 | Croteau et al. |
| 2021/0141655 A1 | 5/2021 | Gamage et al. |
| 2021/0158083 A1 | 5/2021 | Gan et al. |
| 2021/0160162 A1 | 5/2021 | Abbas |
| 2021/0184942 A1 | 6/2021 | Tootaghaj et al. |

OTHER PUBLICATIONS

U.S. Appl. No. 16/367,801, filed Mar. 28, 2019, Featonby et al.
U.S. Appl. No. 16/699,309, filed Nov. 29, 2019, Goodman et al.
U.S. Appl. No. 16/909,756, filed Jun. 23, 2020, Featonby et al.

\* cited by examiner

CONTAINER IMAGE INSPECTION AND OPTIMIZATION

BACKGROUND

Modern computer systems are frequently implemented as distributed collections of computer systems operating collectively within one or more host computer system environments. Such a host computer environment may deploy applications across multiple clusters of servers or virtual machines and manage the applications and the clusters on behalf of customers.

DETAILED DESCRIPTION

Introduction

Figure 1:
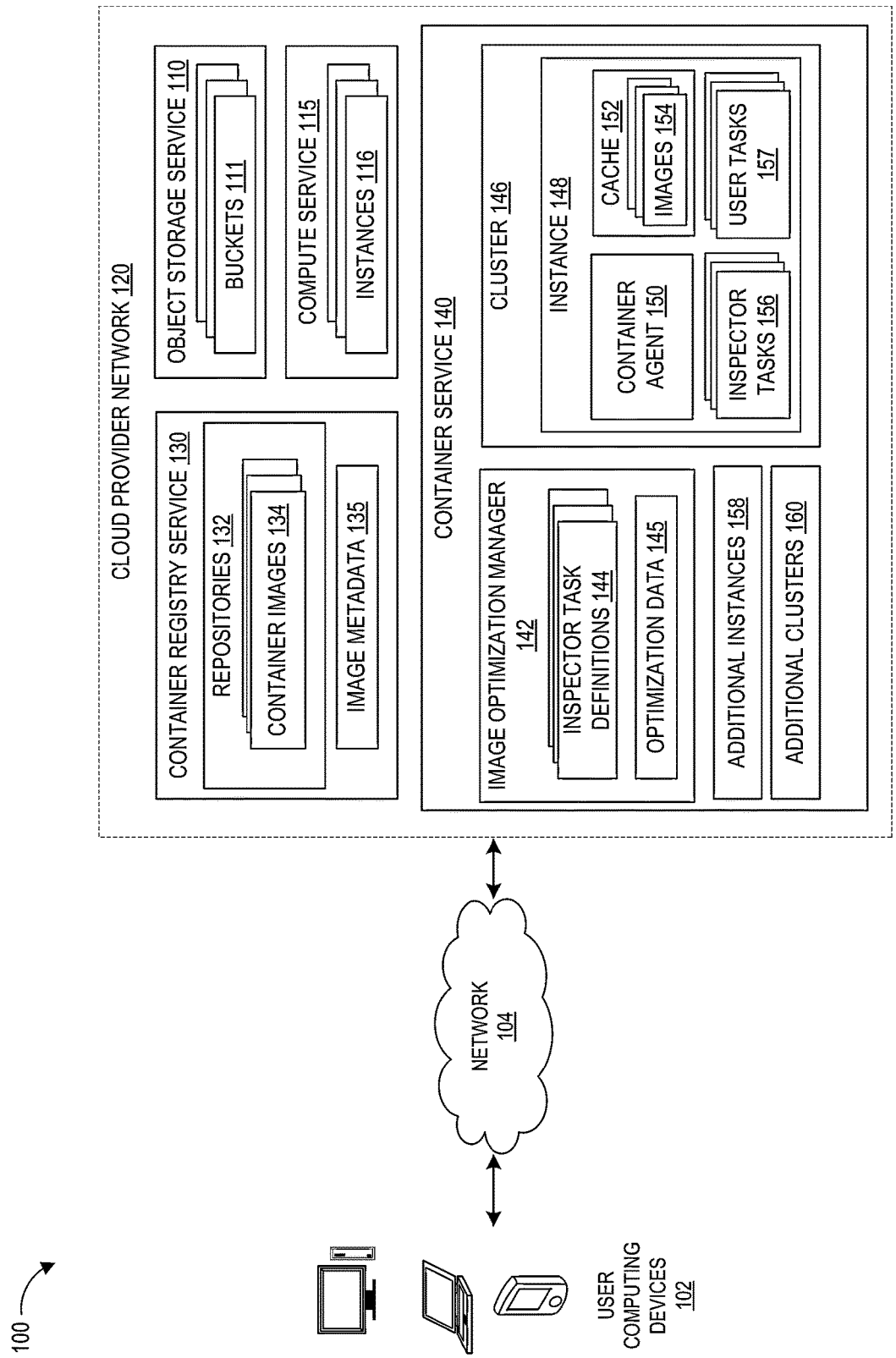
FIG. 1 depicts a schematic diagram of a network environment in which a cloud provider network is used to implement a container service and an image optimization manager in accordance with aspects of the present disclosure.

The present disclosure relates to techniques for inspecting and optimizing container images. A developer can package a software application and everything else needed to run the application in a container image (e.g., a standalone, executable package of software that includes everything needed to run an application process) and send a request to a distributed computing environment, such as a cloud provider network, to execute the application using compute capacity provided by the cloud provider network.

For example, a user may build a container image by starting with one or more base layers including known software components, and then adding additional user-created layers that include user-created software components that depend on the software components contained in the underlying base layers. However, by the time the user has finalized the container image, the container image may have gone through numerous updates and some of the components that were initially used by the software may no longer be used in the final product. Such unused components such as files in the container image can increase the size of the container image and can thus increase the storage costs associated with storing the container image in a container repository and also increase the time it takes to download the container image onto a compute instance where it can be executed, thereby degrading the startup latency performance. Further, the unused components in the container image can expose the container image to security vulnerabilities since any unused binaries may not be properly maintained or updated and provide an attack surface that can be exploited by unauthorized users.

These aforementioned challenges, among others, are addressed in some embodiments by the disclosed techniques for inspecting and optimizing a container image. These techniques enable optimization of a container image by executing an instrumentation task that executes the container image and monitors which files are used during the execution of the container image. The system then removes the unused files from the container image and/or replaces any of the used files that can further improve the performance of the container image. By doing so, the system can reduce the size of the container image, which results in improved startup latency performance, reduced storage costs, and improved security.

As will be appreciated by one of skill in the art in light of the present disclosure, the embodiments disclosed herein improve the ability of computing systems, such as container systems, container image repository systems, and code execution systems, to provide mechanisms for inspecting and optimizing container images to improve code execution performance and reduce network bandwidth and storage costs associated with container images. By removing and/or replacing certain files and/or layers in a container image that degrades the performance of the container image, the cloud provider network of the present disclosure can address the deficiencies described above.

Prior techniques for generating container images generally relied on using one or more base layers including known software components, and then adding additional user-created layers that include user-created software components that depend on the software components contained in the underlying base layers. However, such approaches can result in certain portions of the layers not being used at all in the final container image, thereby unnecessarily increasing the costs associated with storing and transferring the container image and potentially exposing the container image to security vulnerabilities.

In contrast, embodiments of the present disclosure enable inspection and optimization of container images to remove any files and/or layers that may have previously been relied on but no longer used, and/or to replace any files and/or layers that are currently used but can be replaced with files and/or layers with superior performance. By doing so, the image inspection and optimization techniques described herein (i) reduce the size of the container image and thus improve startup latency performance and reduce storage costs, and (ii) reduce or remove the security vulnerabilities caused by having files and/or layers that are not properly maintained or updated.

The presently disclosed embodiments therefore address technical problems inherent within computing systems, such as optimizing network bandwidth and storage performance of containerized software applications while reducing the security vulnerabilities in such applications. These technical problems are addressed by the various technical solutions described herein, including the inspection and optimization of container images. Thus, the present disclosure represents an improvement on existing software storage and execution systems, and computing systems in general.

These and other aspects of the disclosure will now be described with regard to certain examples and embodiments, which are intended to illustrate but not limit the disclosure. Although the examples and embodiments described herein will focus, for the purpose of illustration, on specific calculations and algorithms, one of skill in the art will appreciate the examples are illustrate only, and are not intended to be limiting.

Overview of Example Computing Environment for Container Service

FIG. 1 depicts an example computing environment 100 including a cloud provider network 120 in which the disclosed container service and image optimization manager can be implemented. A cloud provider network (sometimes referred to as a cloud provider system or simply a "cloud") refers to a large pool of network-accessible computing resources (such as compute, storage, and networking resources, applications, and services), which may be virtualized (e.g., virtual machines) or bare-metal (e.g., bare-metal instances or physical machines). The cloud can provide convenient, on-demand network access to a shared pool of configurable computing resources that can be programmatically provisioned and released in response to customer commands. These resources can be dynamically provisioned and reconfigured to adjust to variable load, which provides the "elasticity" of the cloud provider network 120. Cloud computing can thus be considered as both the applications delivered as services over a publicly accessible network (e.g., the Internet, a cellular communication network) and/or the hardware and software in cloud provider data centers that provide those services. It will be appreciated that the disclosed techniques for inspecting and optimizing container images may be implemented in non-elastic computing environments as well.

The cloud provider network 120 can be accessed by user computing devices 102 over a network 104. The cloud provider network 120 may include a container registry service 130, a container service 140 (referred to in various implementations as a container service, cloud container service, container engine, or container cloud service), an object storage service 110, and a compute service 115 (referred to in various implementations as an elastic compute service, a virtual machines service, a computing cloud service, a compute engine, or a cloud compute service) that are in networked communication with one another and with the network 104 to provide users with on-demand access to the services and resources provided by the cloud provider network 120.

In the example of FIG. 1, the container registry service 130 provides repositories 132 and image metadata 135. The repositories 132 store container images 134, including the bits corresponding to the layers that make up the container images 134. The image metadata 135 associated with a container image may specify details about the container image and the runtime environment in which the container image is to be executed including, but not limited to, the image ID, tag, and/or digest that can be used to identify the container image, image path, image version, author, architecture, operating system, image size, layer size, network host/domain/user names exposed network ports, expected resource allocations (CPU, memory, disk, network), layer identifiers, layer hash values, directories and/or files associated with each layer in the container image, and any other parameters specified by the user who uploaded the container image onto the container registry service 130 at the time of uploading the container image (or a public repository within or external to the cloud network provider 120). Although files are used as examples in some embodiments, in other embodiments, any other types or units of data can be used (e.g., as examples of things that can be removed from a container image or replaced in a container image) such as data objects, data blocks, data chunks, libraries, binaries, functions, routines, processes, programs, code, lines of code, and any portions thereof, etc. The image metadata 135 may also indicate dependencies (e.g., whether a layer depends on another layer, whether a layer builds on top of another layers, etc.) among the layers of a single container image. In some embodiments, the image metadata 135 may include information corresponding to container images and/or layers stored in another image repository different from the repositories 132. Such image repository may reside within the cloud provider network 120 or may be external to the cloud provider network 120.

The container service 140 provides an image optimization manager 142, a cluster 146, and additional clusters 160. The image optimization manager 142 manages inspector task definitions 144, which may be used to execute the inspector tasks 156 configured to inspect container images, and optimization data 145, which may be used to optimize such container images (e.g., on behalf of a user of the cloud provider network 120). For example, an inspector task definition 144 may include instructions to execute an inspector task 156 as well as parameters that can be used to execute the inspector task 156. Using the inspector task definition 144, the container service 140 can run a test harness or script (e.g., a set of software components and/or test data usable to execute a user's program code or container image, such as a user task 157, under one or more conditions). In some embodiments, the test harness associated with a container image may be included or identified a request to inspect and/or optimize the container image from the user computing device 102, or otherwise provided or identified by the user of the container image. Upon receiving such a request to inspect and/or optimize a container image (e.g., along with a task definition usable to execute the container image and/or a test harness or script configured to execute the container image), the image optimization manager 142 may modify an inspector task definition 144 to include information about the container image and the parameters included in the received task definition and/or test harness or script so that the execution of the inspector task 156 can trigger the execution of the container image (e.g., the user task 157). The optimization data 145 may include (i) an identification of the used files and unused files during the execution of a container image, (ii) the number of times (or a degree of frequency at which) each file in the container image is used during the execution of the container image, (iii) the order in which the files in the container image are used during the execution of the container image, (iv) the order in which the files in the container image are loaded during the execution of the container image, and/or (v) a mapping that indicates, for each given file identified in the mapping, a corresponding file that can replace the given file to improve the performance of the container image. The optimization data 145 may also include a report generated for the container image, indicating any combination of the information included in the optimization data 145 such as the identification of used files and/or unused files, frequency of usage, usage order, load order, and the like. Such a report may also include an indication of one or more files of the container image that can be removed or replaced and/or an indication of one or more replacement files that can replace such one or more files of the container image. Although the optimization data 145 is described above with reference to a single container image, the optimization data 145 can include such data for each of a plurality of container images processed or analyzed by the container service 140. The techniques for inspecting and optimizing container images are described in greater detail below with reference to FIGS. 2-6. Although the additional instances clusters 160 are shown in FIG. 1, in other embodiments, the container service 140 may include only a single cluster.

The cluster 146 includes an instance 148 and additional instances 158. The instance 148 includes a container agent 150 configured to perform operations on behalf of the instance 148, cache 152 storing container images 154, inspector tasks 156 configured to inspect user tasks 157 and monitor the execution of the user tasks 157. For example, the inspector task 156 may be implemented using a root sidecar container configured to run a corresponding user task 157 in a sandbox such that the inspector task 157 can determine which files are being accessed, which libraries are being loaded, etc. during the execution of the user task 157. Alternatively, the container image inspection and optimization described herein may be implemented using an orchestrated runtime environment that is configured to launch one or more user tasks 157 and monitor and log the file usage during the execution of such user tasks. For example, such a runtime environment may be provided by a compute planform that is configured to execute user code on a per-request basis. In such an example, by sending a code execution request to the compute platform with a flag indicating that the code execution should be an "inspector launch" in which the compute planform should monitor and log the file usage during the execution of the user tasks 157, the container image inspection and optimization can be performed without using a separate sidecar container. Alternatively, the compute platform may provide container image inspection/optimization as an option separate from container image execution. Although the additional instances 158 are shown in FIG. 1, in other embodiments, the cluster 146 may include only a single instance. Although some embodiments of the present disclosure are described with reference to the instances 148 and the additional instances 158 that are part of the cloud provider network 120, in other embodiments, the techniques described herein are applied to one or more instances that are outside the cloud provider network 120 (e.g., implemented using the user computing devices 102 and/or on-premises computing resources). In some embodiments, the container images and/or the container image layers described herein are cached at the instance layer (e.g., in the example of virtual machines).

The container service 140 may provide a set of application programming interfaces ("APIs") that can be used by the users of the user computing devices 102 to request inspection and/or optimization of container images, and/or request execution of container images on the clusters. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

A container, as referred to herein, packages up code and all its dependencies so an application (also referred to as a task, pod, or cluster in various container platforms) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example, by being launched within the same virtual machine. In contrast, virtual machines are an abstraction of the hardware layer (meaning that each virtual machine simulates a physical machine that can run software). Virtual machine technology can use one physical server to run the equivalent of many servers (each of which is called a virtual machine). While multiple virtual machines can run on one physical machine, each virtual machine typically has its own copy of an operating system, as well as the applications and their related files, libraries, and dependencies. The instances, as used herein, may include such virtual machines. For example, some containers can be run on virtual machines that are running a container agent, and some containers can be run on bare-metal servers.

A container image representing a containerized software application is often comprised of one or more "base" image layers which can be optionally "overlaid" with one or more user-created layers. The base image layers, for example, typically include various types of commonly used software applications such as operating systems, database servers, web-application frameworks, and so forth, upon which various types of user applications can be created. An example container image, for example, might include one base image layer including a popular operating system distribution, another base image layer including a popular open-source database server, and a user may overlay those images with a custom container image including user-created software that depends on the software contained in the underlying layers. Additional details relating to container images and container image layers are provided, for example, in U.S. application Ser. No. 16/217,454, filed Dec. 12, 2018, titled "SHARING PREPOPULATED CONTAINER IMAGE CACHES AMONG CONTAINER EXECUTION ENVIRONMENTS," which is incorporated herein by reference in its entirety.

In the context of some software container services, a task refers to a container, or multiple containers working together, running to execute the functionality of a software application or a particular component of that application. In some implementations, tasks can also include virtual machines, for example, virtual machines running within instance(s) hosting the container(s). A task definition can enable container images to be run in a cloud provider network to execute a task. A task definition can specify parameters including which container image to use with each container in the task, interactions between containers, constraints on container placement within a cloud provider network, what quantities of different hardware resources should be allocated to the task or to specific containers, networking modes, logging configurations, persistent storage that should be used with the containers in the task, and whether the task continues to run if a container finishes or fails. Multiple containers can be grouped into the same task definition, for example, linked containers that must be run together to execute related processes of an application, containers that share resources, or containers that are required to be run on the same underlying host. An entire application stack can span multiple task definitions by separating different components of the application into their own task definitions. An application can be defined using a service definition, which can specify configuration parameters that define the service including which task definition(s) to use, how many instantiations of each task to run, and how the tasks should be load balanced.

In some implementations, customers of a cloud provider network 120 can deploy containers by managing clusters of compute instances that run container agents. In such implementations, customers manage scaling, monitoring, patching, and security of the compute instances, in addition to managing their containerized workload. In some implementations, customers of a cloud provider may deploy and scale containerized workloads automatically without having to manage the underlying computing resources, for example, via a container management service that receives information from a customer about their workload and then automatically selects the appropriate compute resources to run the workload. Beneficially, such a "serverless container" approach abstracts away the underlying infrastructure, enabling the customer to simply focus on their containerized application, by managing clusters of compute instances on behalf of the customer.

The traffic and operations of the cloud provider network 120 may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information, etc.). The data plane includes customer resources that are implemented on the cloud provider network (e.g., computing instances, containers, block storage volumes, databases, file storage, etc.). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

The container registry service 130 and/or the container service 140 may utilize the services provided by the compute service 115 to perform one or more of the techniques described herein (e.g., to provide the instances 148 and 158). The compute service 115 may include one or more servers which provide resizable computing capacity to users for building and hosting their software systems. The compute service 115 and associated control plane functionality can provide an elastic compute cloud service of the cloud provider network 120. Compute resources can be provided from the compute service 115 to customers via an elastic compute cloud service (referred to in various implementations as an elastic compute service, a virtual machines service, a computing cloud service, a compute engine, or a cloud compute service). Users can use the compute service 115 to launch as many virtual computing environments, referred to as virtual compute instances, virtual machine instances, virtual machines, or "instances" 116, as they need. Instances 116 can have various configurations of processing power, memory, storage, and networking capacity depending upon user needs. The compute service 115 can also include computer storage for temporary data used while an instance is running; however, as soon as the instance is shut down this data is lost.

The cloud provider network 120 (e.g., the compute service 115 or another provider of compute capacity) may provide the instances (also referred to as virtual compute instances, compute instances, virtual machine instances, or virtual machines) shown in FIG. 1 with varying computational and/or memory resources. In one embodiment, each of the virtual compute instances may correspond to one of several instance types or families. An instance type may be characterized by its hardware type, computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Each instance type can have a specific ratio of processing, local storage, memory, and networking resources, and different instance families may have differing types of these resources as well. Multiple sizes of these resource configurations can be available within a given instance type. Although the instances 148 and 158 are used as examples in FIG. 1, the compute resources usable by the clusters 146 and 160 include one or more of physical machines, virtual machines, containers, nodes, or other forms of virtual or physical compute units that are configured to execute one or more applications.

In some implementations, at least a subset of virtualization management tasks may be performed at one or more offloading cards so as to enable more of the processing capacity of the host to be dedicated to client-requested compute instances—e.g., cards connected via Peripheral Component Interconnect (PCI) or Peripheral Component Interconnect Express (PCIe) to the physical CPUs and other components of the virtualization host may be used for some virtualization management components. Such an offload card of the host can include one or more CPUs and/or other computing resources that are not available to customer instances, but rather are dedicated to instance management tasks such as virtual machine management, input/output virtualization to network-attached storage volumes, local migration management tasks, instance health monitoring, and the like. Alternatively or additionally, such an offload card may provide additional computing resources usable by customer instances.

As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Additionally, the container registry service 130 and/or the container service 140 may utilize the services provided by the object storage service 110 to perform one or more of the techniques described herein (e.g., to provide the repositories 132, to store the image metrics 136, and to store the cluster manifests 144). The object storage service 110 represents another type of storage within the cloud provider network 120. The object storage service 110 and associated control plane functionality can provide an object-based storage service of the cloud provider network 120. Object-based storage services can be referred to as a blob storage service, cloud object storage service, or cloud storage service, in various implementations. The object storage service 110 include one or more servers on which data is stored as objects within resources referred to as buckets 111. Each object typically includes the data being stored, a variable amount of metadata that enables various capabilities for the object storage service 110 with respect to analyzing a stored object, and a globally unique identifier or key that can be used to retrieve the object. Objects stored on the object storage service 110 are associated with a unique identifier, such that authorized access to them can be obtained through requests from networked computing devices in any location.

Each bucket 111 is associated with a given user account. Users can store as many objects as desired within their buckets, can write, read, and delete objects in their buckets, and can control access to their buckets and the objects contained therein. For example, the instances 116 may access the buckets 111 to write, read, or delete the objects contained therein. Further, in embodiments having a number of different object storage service 110 distributed across different ones of the regions described above, users can choose the region (or regions) where a bucket is stored, for example, to optimize for latency. Users can use object storage service 110 for purposes such as storing photos on social media websites, songs on music streaming websites, or files in online collaboration services, to name a few examples. Applications developed in the cloud often take advantage of the vast scalability and metadata characteristics of the object storage service 110. The object storage service 110 can support highly parallel data accesses and transfers.

Some implementations of the cloud provider network 120 can additionally include block store servers, domain name services ("DNS") servers, relational database servers, and other server configurations (not illustrated) for supporting on-demand cloud computing platforms. Each server (or service illustrated in FIG. 1) includes hardware computer memory and/or processors, an operating system that provides executable program instructions for the general administration and operation of that server, and a computer-readable medium storing instructions that, when executed by a processor of the server, allow the server to perform its intended functions.

The cloud provider network 120 can be formed as a number of regions, where a region is a separate geographical area in which the cloud provider clusters data centers. Each region can include two or more availability zones connected to one another via a private high speed network, for example, a fiber communication connection. An availability zone (also known as an availability domain, or simply a "zone" or an "AZ") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs are the primary backbone locations linking customers to the cloud provider network, and may be collocated at other network provider facilities (e.g., Internet service providers, telecommunications providers) and securely connected (e.g., via a VPN or direct connection) to the availability zones. Each region can operate two or more TCs for redundancy. Regions are connected to a global network which includes private networking infrastructure (e.g., fiber connections controlled by the cloud provider) connecting each region to at least one other region. The cloud provider network may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the cloud provider network to provide low latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network 120 can provide on-demand, scalable computing platforms to users through the network 104, for example, allowing users to have at their disposal scalable physical and/or virtual computing devices via their use of the instances illustrated in FIG. 1. These virtual computing devices have attributes of a personal computing device including hardware (various types of processors, local memory, random access memory ("RAM"), hard-disk and/or solid-state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or clients.

As illustrated in FIG. 1, the cloud provider network 120 can communicate over network 104 with user computing devices 102. The network 104 can include any appropriate network, including an intranet, the Internet, a cellular network, a local area network or any other such network or combination thereof. In the illustrated embodiment, the network 104 is the Internet. Protocols and components for communicating via the Internet or any of the other aforementioned types of communication networks are known to those skilled in the art of computer communications and thus, need not be described in more detail herein. The user computing devices 102 can include any network-equipped computing device, for example, desktop computers, laptops, smartphones, tablets, e-readers, gaming consoles, and the like. Users can access the cloud provider network 120 via the network 104 to view or manage their data and computing resources, as well as to use websites and/or applications hosted by the cloud provider network 120.

The cloud provider network 120 may implement various computing resources or services (some of which may not be illustrated in FIG. 1), which may include a virtual compute service (referred to in various implementations as an elastic compute service, a virtual machines service, a computing cloud service, a compute engine, or a cloud compute service), a container orchestration and management service (referred to in various implementations as a container service, cloud container service, container engine, or container cloud service), a Kubernetes-based container orchestration and management service (referred to in various implementations as a container service for Kubernetes, Azure Kubernetes service, IBM cloud Kubernetes service, Kubernetes engine, or container engine for Kubernetes), data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider network 120, in contrast to resources requested by users of the cloud provider network 120, which may be provisioned in user accounts. The disclosed techniques for inspecting and optimizing container images can be implemented as part of a virtual compute service, container service, or Kubernetes-based container service in some embodiments.

In some embodiments, the execution of compute instances is supported by a lightweight virtual machine manager (VMM). These VMMs enable the launch of lightweight micro-virtual machines (microVMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Although some embodiments of the present disclosure describe an instance as being a virtual machine, an instance, as used herein, may refer to any one of a virtual machine instance, a bare-metal instance, a microVM, a physical machine, a container, a node, an offload card, or another unit of compute capacity configurable to execute user code. Such an instance may reside within the cloud provider network 120 or within an on-premises environment outside the cloud provider network 120.

Contents of a Container Image

Figure 2:
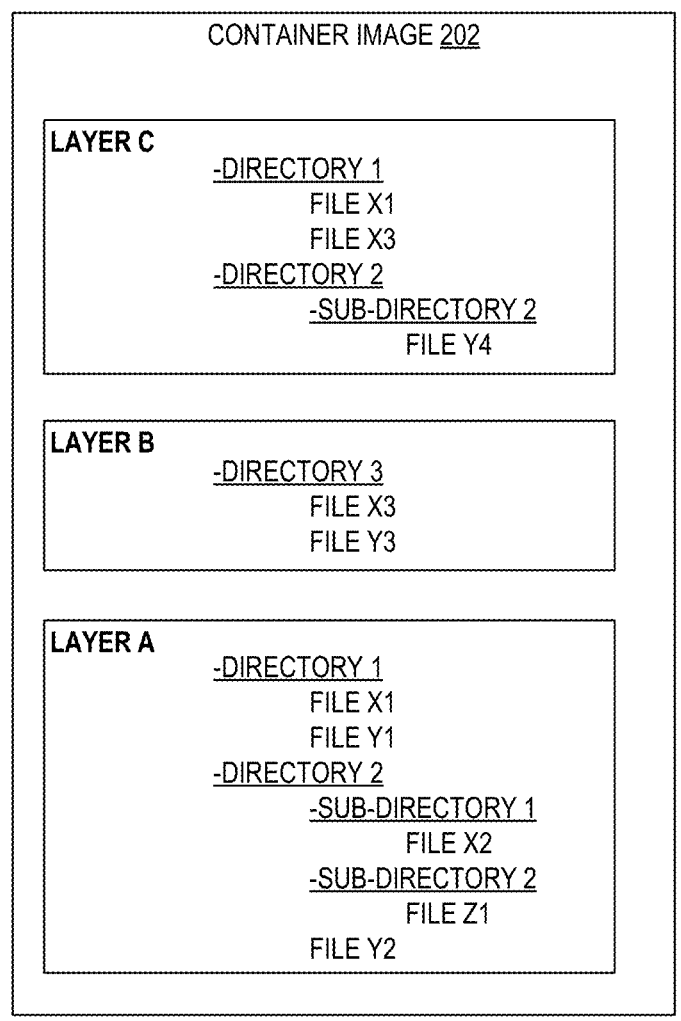
FIG. 2 depicts a block diagram of a container image in accordance with aspects of the present disclosure.

FIG. 2 is a block diagram illustrating the contents of a container image 202. As shown in FIG. 2, the container image 202 includes Layer A, Layer B, and Layer C, each including one or more directories and files. The layers shown in FIG. 2 may be a read-only layer (e.g., immutable portion of the container image on top of which other layers build) or a readable-writable layer (e.g., additional code that makes changes to the immutable portion of the container image). In some embodiments, if a file that exists in a lower layer (e.g., Layer A) also exists in a higher layer (e.g., Layer C), the file in the higher layer replaces the same file in the lower layer (e.g., File X1 in Directory 1).

If the layer from which an unused file is to be removed according to the techniques described herein is a read-only layer, the image optimization manager 142 may generate a new layer that does not include the unused file. If the layer from which an unused file is to be removed is a readable-writable layer, the image optimization manager 142 may simply remove the unused file from the layer. Alternatively, the image optimization manager 142 may instead generate a new layer that does not include the used file.

Example Routine for Inspecting a Container Image

Figure 3A:
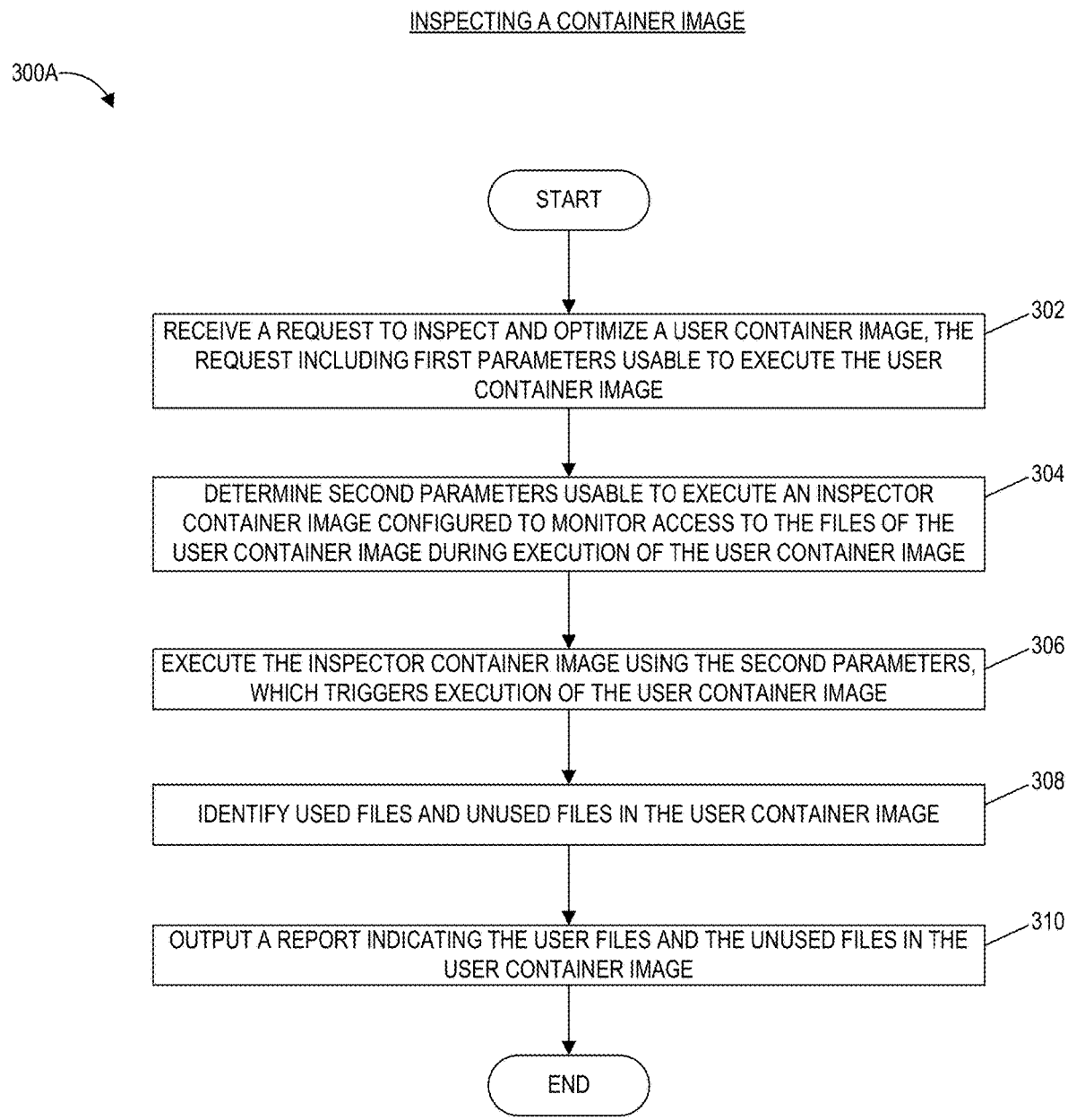
FIG. 3A is a flowchart of an example process for inspecting a container image in accordance with aspects of the present disclosure.

FIG. 3A depicts an illustrative routine 300A for inspecting a container image in accordance with aspects of the present disclosure. The routine 300A may be carried out, for example, by the container service 140 (or a component thereof such as the image optimization manager 142) or one or more other components of the cloud provider network 120 described herein. For convenience, some or all of the steps of the routine 300A are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 300A.

The routine 300A begins at block 302, at which the container service 140 receives a request to inspect a first container image, where the request includes a first set of parameters usable to execute the first container image. For example, the first set of parameters may include or indicate (i) how long to run the first container image (e.g., for inspection purposes), (ii) the test input(s) to be provided to the first container image, (iii) whether the user wants a report and/or whether the user wants the first container image optimized (e.g., by either modifying the first container image or building a new container image), (iv) an image repository identifier usable to identify the image repository or a storage destination in which the optimized container image can be stored, and/or (v) a task definition or a test harness to be used to run the first container image. If one or more of these parameters are not included in or indicated by the request, a default parameter may be used.

At block 304, the container service 140 determines a second set of parameters usable to execute an inspector container image configured to monitor access to the files of the first container image during execution of the first container image. For example, the second set of parameters may include a task definition (e.g., inspector task definition 144 of FIG. 1) usable to run the inspector container image. In some embodiments, the inspector container image is selected based on the platform and/or CPU architecture associated with the first container image. For example, if the first container image is a Windows container image, a Windows inspector container image may be selected, and if the first container image is a Linux container image, a Linux inspector container image may be selected. As another example, if the first container image is to be executed using Graviton2 processors, a Graviton2 inspector container image may be selected, and if the first container image is to be executed using Intel processors, an Intel inspector container image may be selected. If the first container image supports multiple architectures, a different inspector container image may be selected for each supported architecture, and blocks 304-310 may be repeated in different sandboxes for each supported architecture.

At block 306, the container service 140 executes the inspector container image using the second set of parameters, where the execution of the inspector container image triggers the execution of the first container image, during which one or more files of the files in the first container image are accessed. For example, during its execution the inspector container image may generate a report that indicates whether each file in the first container image is used or not used.

At block 308, the container service 140 identifies any used files and unused files in the first container image based on the execution of the first container image.

At block 310, the container service 140 generates and outputs a second container image that contains the used files of the first container image but does not include the unused files of the first container image. The routine 300A may then end.

The routine 300A can include fewer, more, or different blocks than those illustrated in FIG. 3A and/or one or more blocks illustrated in FIG. 3A may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Optimizing a Container Image

Figure 3B:
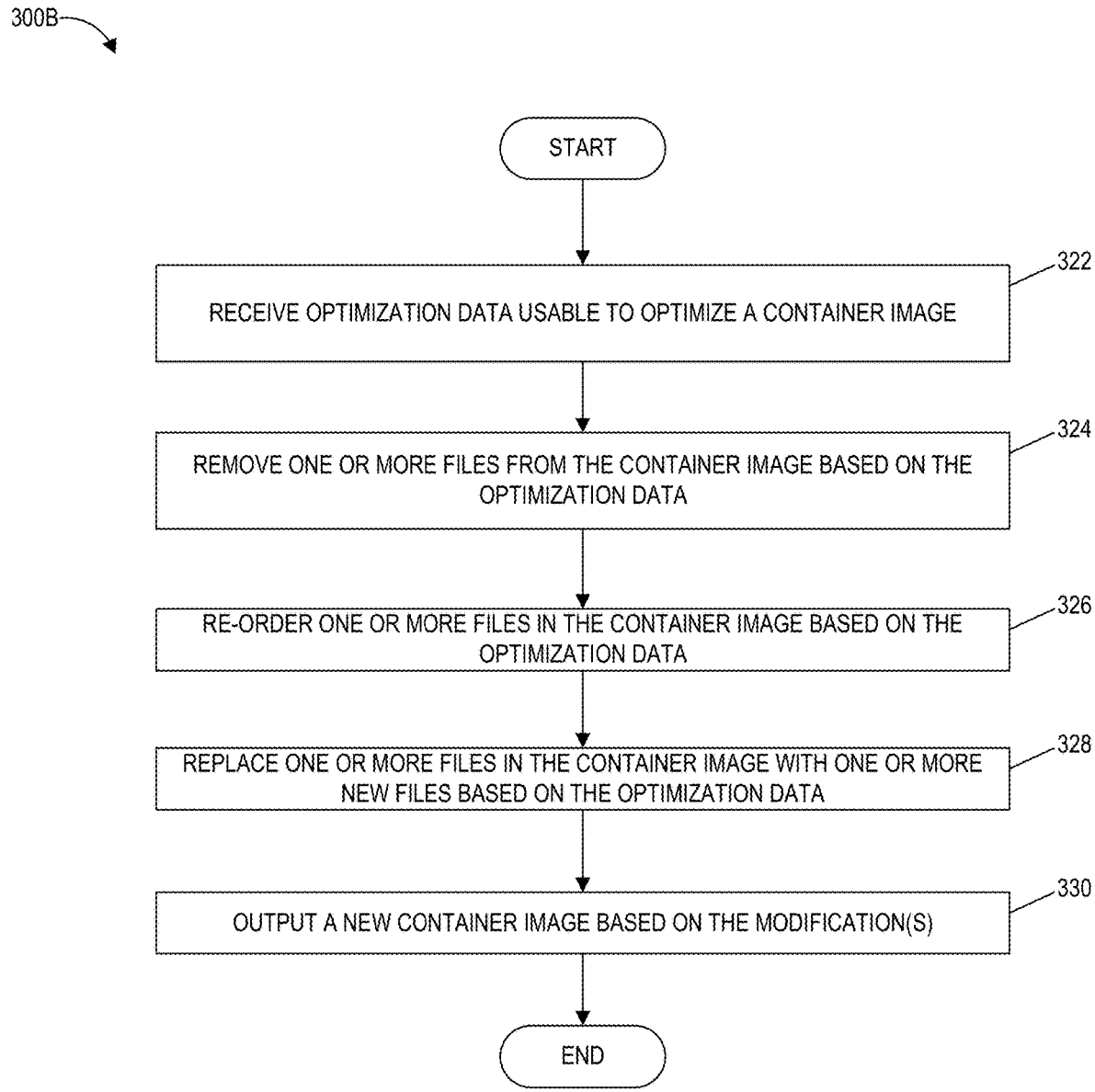
FIG. 3B is a flowchart of an example process for optimizing a container image in accordance with aspects of the present disclosure.

FIG. 3B depicts an illustrative routine 300B for optimizing a container image in accordance with aspects of the present disclosure. The routine 300B may be carried out, for example, by the container service 140 (or a component thereof such as the image optimization manager 142) or one or more other components of the cloud provider network 120 described herein. For convenience, some or all of the steps of the routine 300B are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 300B.

The routine 300B begins at block 322, at which the container service 140 receives optimization data usable to optimize a container image. For example, the optimization data may include any combination of the information described herein as being included in the optimization data 145 of FIG. 1. In some embodiments, the container service 140 retrieves the optimization data 145 in response to receiving a request to optimize the container image.

At block 324, the container service 140 removes one or more files from the container image based on the optimization data. For example, the container service 140 may determine, based on the optimization data, whether the container image includes one or more unused or underused files that can be removed from the container image. If the container service 140 determines that the container image includes one or more unused or underused files that can be removed from the container image, the container service 140 may remove such files from the container image. Otherwise, block 324 may be omitted.

At block 326, the container service 140 removes one or more files from the container image based on the optimization data. For example, the container service 140 may determine, based on the optimization data, whether the container image includes one or more unused or underused files that can be removed from the container image. If the container service 140 determines that the container image includes one or more unused or underused files that can be removed from the container image, the container service 140 may remove such files from the container image. Otherwise, block 326 may be omitted.

At block 328, the container service 140 removes one or more files from the container image based on the optimization data. For example, the container service 140 may determine, based on the optimization data, whether the container image includes one or more unused or underused files that can be removed from the container image. If the container service 140 determines that the container image includes one or more unused or underused files that can be removed from the container image, the container service 140 may remove such files from the container image. Otherwise, block 328 may be omitted.

At block 330, the container service 140 outputs a new container image based on the modification(s) performed at blocks 324-328, if any. In some embodiments, the new container image is created by building a new container image that reflects the modification(s) performed above. In other embodiments, the new container image is created by adding to or modifying or removing one or more portions of the container image (e.g., portions of the container image that are re-writable or not read-only). The routine 300B may then end.

The routine 300B can include fewer, more, or different blocks than those illustrated in FIG. 3B and/or one or more blocks illustrated in FIG. 3B may be modified, omitted, or switched without departing from the scope of the description. Although the routine 300B is shown as including a single flow, in some embodiments, blocks 322-330 may be repeated until a desired level of optimization has been reached. For example, the routine 300A of FIG. 3A may be performed on the new container image outputted at block 330, and based on the optimization data included in the report outputted at block 310 of FIG. 3A, the routine 300B can be performed on the new container image, which may result in another new container image at block 330. This process can be repeated until no further optimization can (or need to) be performed. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Testing an Optimized Container Image

Figure 4:
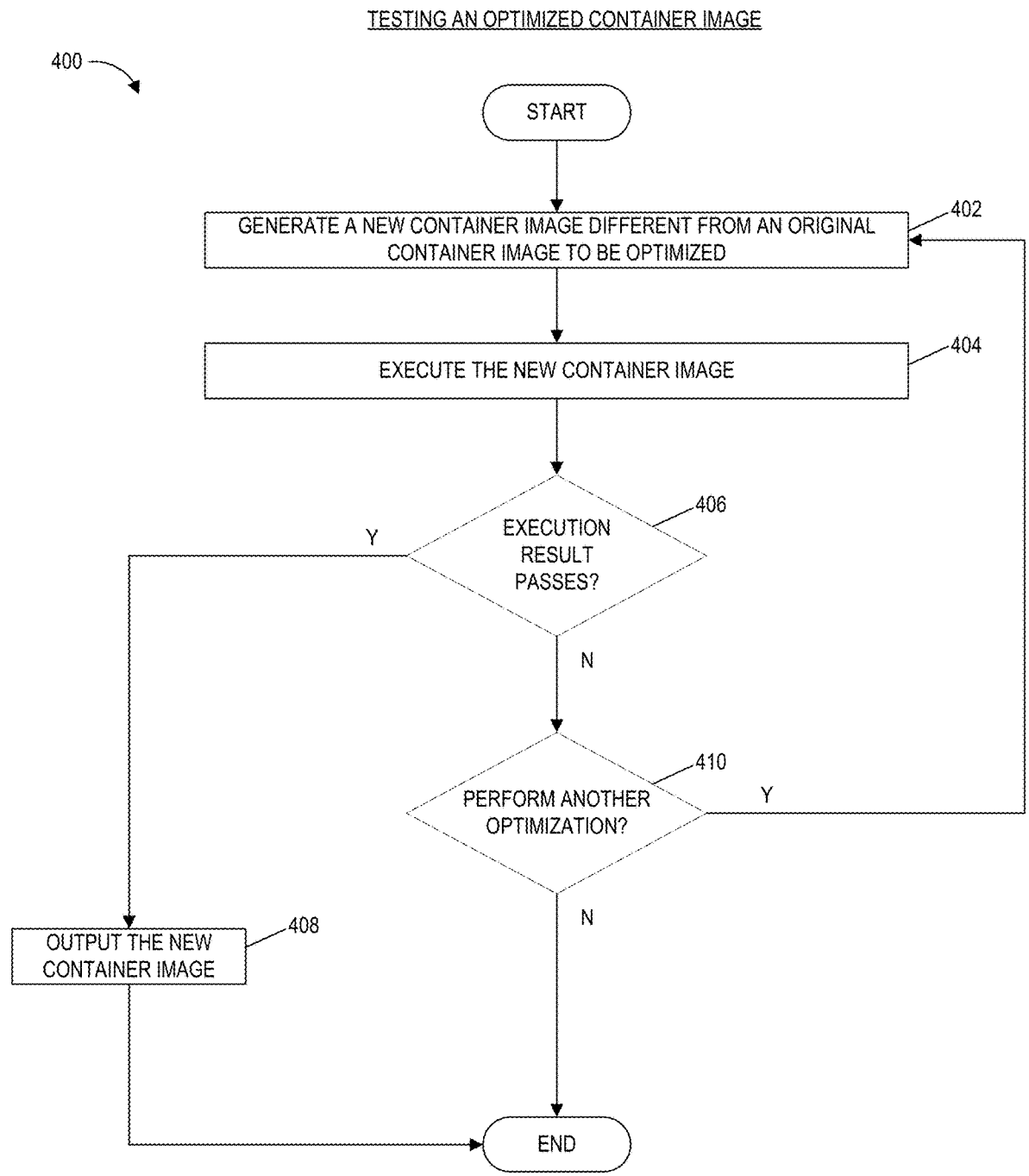
FIG. 4 is a flowchart of an example process for testing an optimized container image in accordance with aspects of the present disclosure.

FIG. 4 depicts an illustrative routine 400 for testing an optimized container image in accordance with aspects of the present disclosure. The routine 400 may be carried out, for example, by the container service 140 (or a component thereof such as the image optimization manager 142) or one or more other components of the cloud provider network 120 described herein. For convenience, some or all of the steps of the routine 400 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 400.

The routine 400 begins at block 402, at which the container service 140 generates a new container image different from an original container image to be optimized. For example, the container service 140 may generate the new container image by performing one or more of: (i) removing one or more unused files, (ii) re-ordering one or more used files such that a file that is used or loaded sooner or more frequently precedes, in load order, another file that is used or loaded later or less frequently, (iii) replacing one or more used files of the original container image with another one or more files not in the original container image.

At block 404, the container service 140 executes the new container image, for example, using the set of parameters provided by the user who has requested optimization of the original container image.

At block 406, the container service 140 determines whether the result of the execution passes a check. For example, the check may be used to determine whether the execution of the new container image produces the same results or response as the execution of the original container image. As another example, the check may be used to determine whether the execution of the new container image results in any errors. As yet another example, the check may be used to determine whether the access pattern (e.g., the files used or accessed during the execution of the container image, and/or the order in which the files were used or accessed during the execution of the container image) for the current execution of the container image (e.g., subsequent to the optimization performed at block 402) mirrors the access pattern for the prior execution of the container image (e.g., prior to the optimization performed at block 402). If the container service 140 determines that the result passes the check, the routine 400 proceeds to block 408, where the container service 140 outputs the new container image to the user. Otherwise, the routine 400 proceeds to block 410.

At block 410, the container service 140 determines whether another optimization is to be performed. If the container service 140 determines that another optimization is to be performed, the routine 400 returns to block 402. For example, the container service 140 may generate another container image by keeping one or more files that were removed in the prior iteration of the container image and repeat the blocks 404 and 406 (e.g., until the execution result passes the check at block 406). Otherwise, the routine 400 may then end.

The routine 400 can include fewer, more, or different blocks than those illustrated in FIG. 4 and/or one or more blocks illustrated in FIG. 4 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Figure 5:
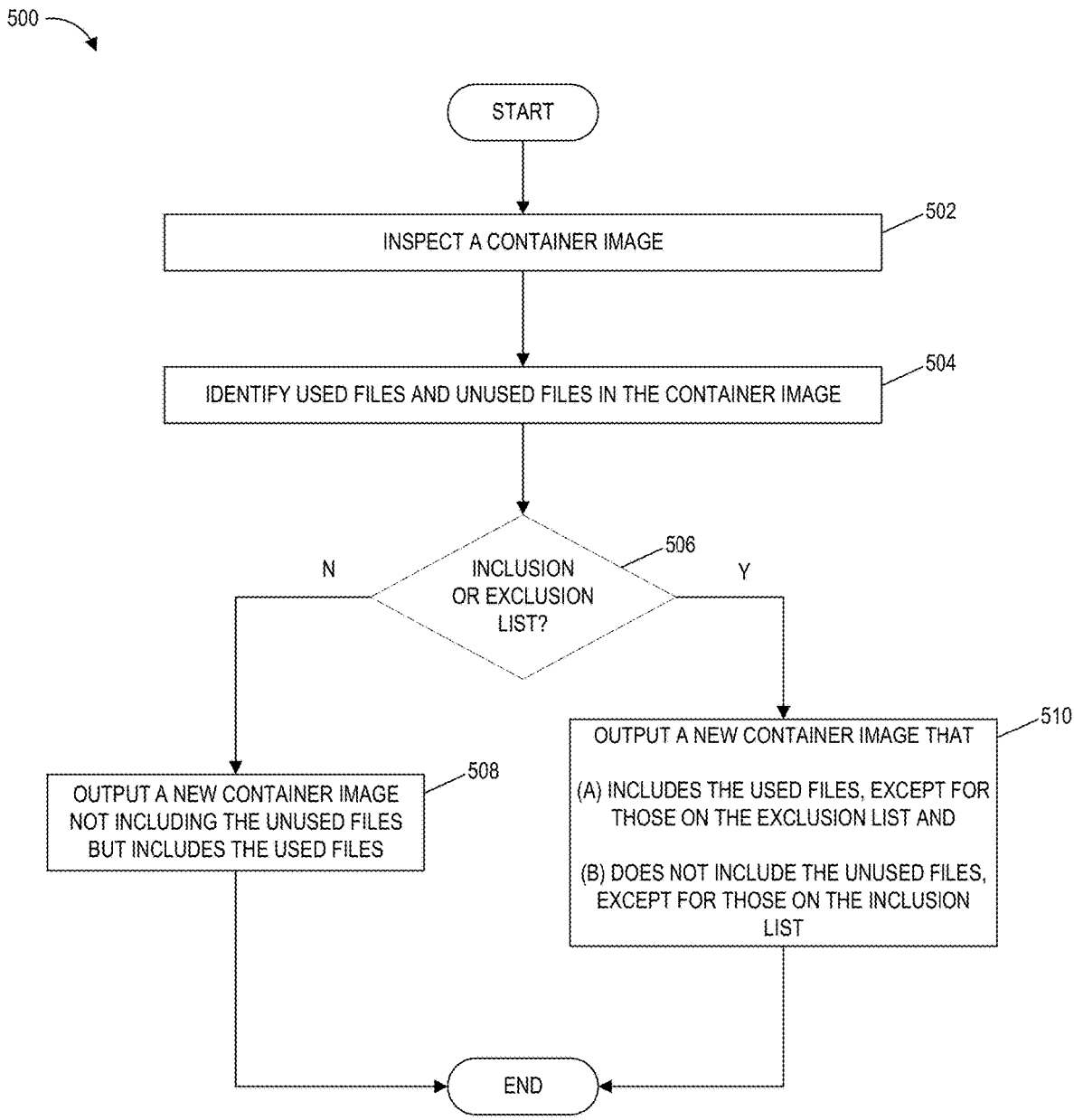
FIG. 5 is a flowchart of an example process for optimizing a container image based on an inclusion list or an exclusion list in accordance with aspects of the present disclosure.

Example Routine for Optimizing a Container Image Based on Inclusion/Exclusion Lists FIG. 5 depicts an illustrative routine 500 for optimizing a container image based on an inclusion list or an exclusion list in accordance with aspects of the present disclosure. The routine 500 may be carried out, for example, by the container service 140 (or a component thereof such as the image optimization manager 142) or one or more other components of the cloud provider network 120 described herein. For convenience, some or all of the steps of the routine 500 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 500.

The routine 500 begins at block 502, at which the container service 140 inspects a container image. The inspection of the container image may be performed using the techniques described with reference to FIG. 4.

At block 504, the container service 140 identifies the used files and the unused files in the container image. The identification of the used and unused files may be performed using the techniques described with reference to FIG. 4.

At block 506, the container service 140 determines whether there exists an inclusion list, an exclusion list, or both. If the container service 140 determines that none of such lists exists, the routine 500 proceeds to block 508, where the container service 140 outputs a new container image that does not include the unused files but includes the used files. Otherwise, the routine 500 proceeds to block 510.

At block 510, the container service 140 outputs a new container image that (A) includes the used files, except for those on the exclusion list (e.g., any file on the exclusion list would be excluded from the new container image, despite being determined to be used), and (B) does not include the unused files, except for those on the inclusion list (e.g., any file on the inclusion list would be included in the new container image, despite being determined not to be used). The routine 500 may then end.

The routine 500 can include fewer, more, or different blocks than those illustrated in FIG. 5 and/or one or more blocks illustrated in FIG. 5 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Routine for Optimizing Layers in a Container Image

Figure 6:
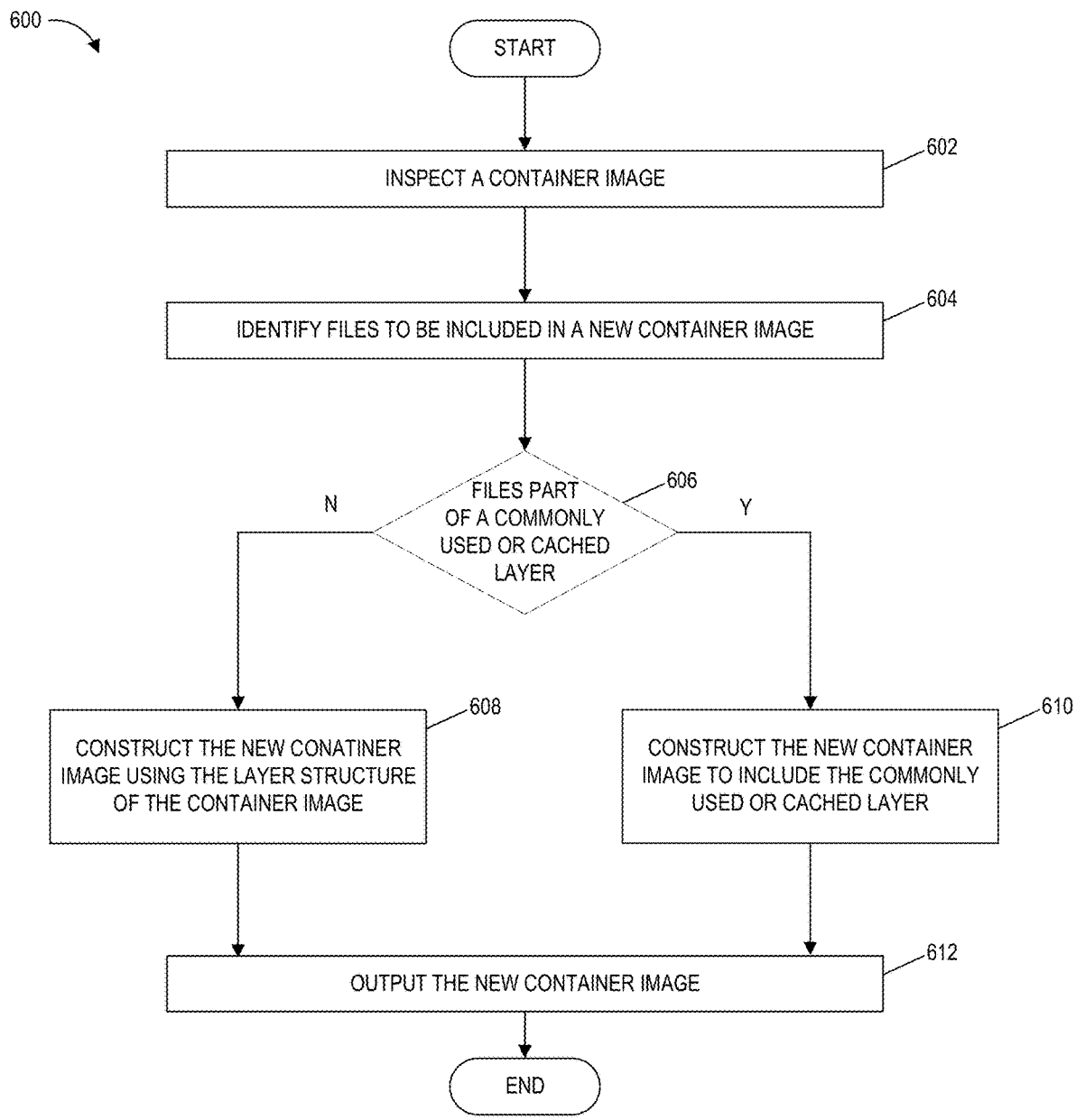
FIG. 6 is a flowchart of an example process for optimizing layers in a container image in accordance with aspects of the present disclosure.

FIG. 6 depicts an illustrative routine 600 for optimizing layers in a container image in accordance with aspects of the present disclosure. The routine 600 may be carried out, for example, by the container service 140 (or a component thereof such as the image optimization manager 142) or one or more other components of the cloud provider network 120 described herein. For convenience, some or all of the steps of the routine 600 are described as being performed by the container service 140. For example, the container service 140 may include one or more hardware computing devices and non-transitory physical computer storage storing instructions that, when executed by the one or more hardware computing devices, cause the one or more hardware computing devices to perform the steps of the routine 600.

The routine 600 begins at block 602, at which the container service 140 inspects a container image. The inspection of the container image may be performed using the techniques described with reference to FIG. 4.

At block 604, the container service 140 determines the files to be included in a new container image. The identification of the files may be performed using the techniques described with reference to FIG. 4.

At block 606, the container service 140 determine whether one or more of the identified files are part of a commonly used or cached layer. If the container service 140 determines that one or more of the identified files are not part of a commonly used or cached layer, the routine 600 proceeds to block 608, where the container service 140 constructs the new container image using the layer structure of the container image. Otherwise, the routine 600 proceeds to block 610.

At block 610, the container service 140 constructs the new container image to include the commonly used or cached layer. For example, the files not included in the commonly used or cached layer can be included in a single layer, or placed in one or more layers that mirror the layer structure of the original container image.

At block 612, the container service 140 outputs the new container image. The routine 600 may then end.

The routine 600 can include fewer, more, or different blocks than those illustrated in FIG. 6 and/or one or more blocks illustrated in FIG. 6 may be modified, omitted, or switched without departing from the scope of the description. Moreover, it will be appreciated by those skilled in the art and others that some or all of the functions described in this disclosure may be embodied in software executed by one or more processors of the cloud provider network 120 and/or the user computing device 102 disclosed herein.

Example Architecture of Computing System

Figure 7:
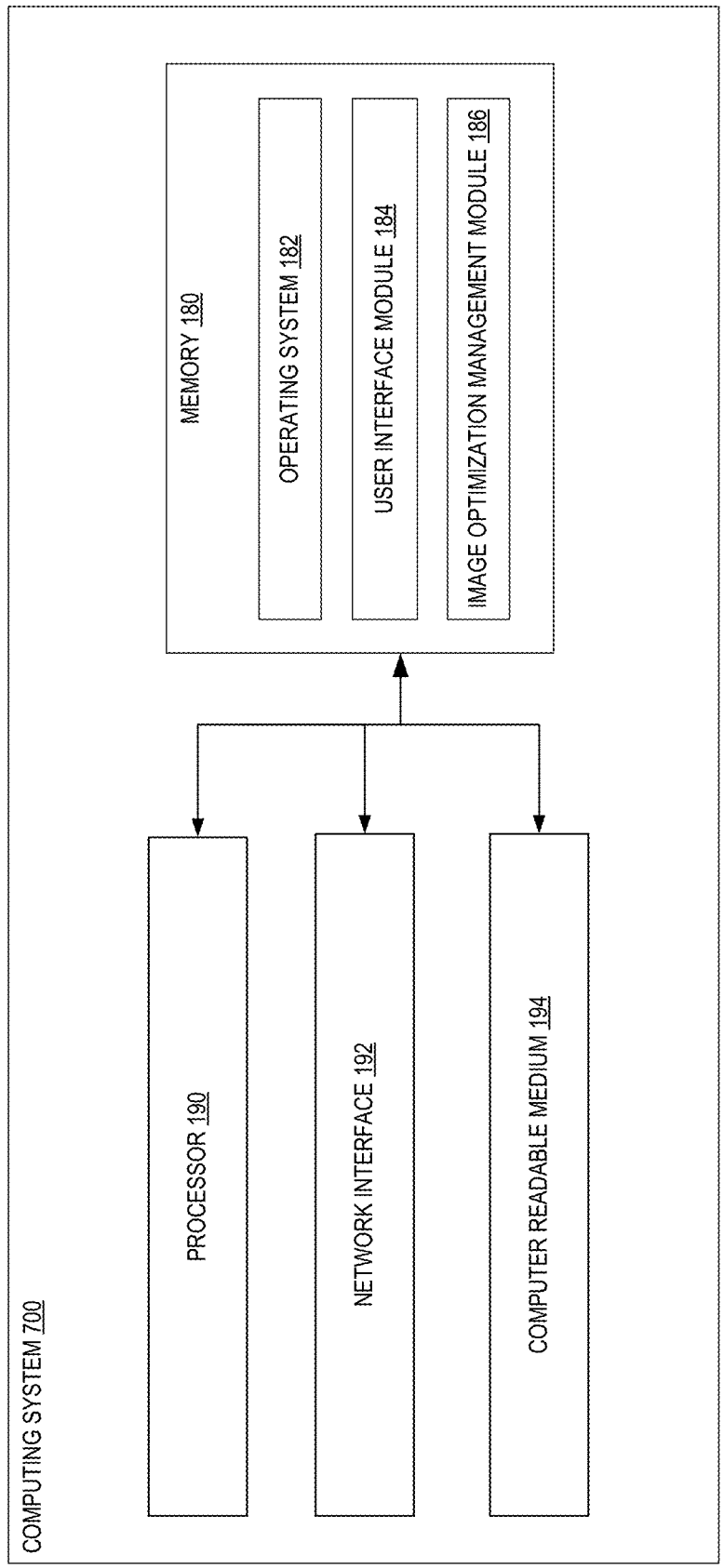
FIG. 7 depicts a general architecture of a computing device or system usable to implement one or more components descried herein, in accordance with aspects of the present disclosure.

FIG. 7 depicts an example architecture of a computing system 700 that can be used to perform one or more of the techniques described herein or illustrated in FIGS. 1-6. The general architecture of the computing system 700 depicted in FIG. 7 includes an arrangement of computer hardware and software modules that may be used to implement one or more aspects of the present disclosure. The computing system 700 may include many more (or fewer) elements than those shown in FIG. 7. It is not necessary, however, that all of these elements be shown in order to provide an enabling disclosure. For example, the computing system 700 may be used to implement one or more of the elements described herein, including the container registry service 130, container service 140, object storage service 110, compute service 115, and/or the user computing devices 102.

As illustrated, the computing system 700 includes a processor 190, a network interface 192, and a computer-readable medium 194, all of which may communicate with one another by way of a communication bus. The network interface 192 may provide connectivity to one or more networks or computing systems. The processor 190 may thus receive information and instructions from other computing systems or services via the network 104 illustrated in FIG. 1.

The processor 190 may also communicate with memory 180. The memory 180 may contain computer program instructions (grouped as modules in some embodiments) that the processor 190 executes in order to implement one or more aspects of the present disclosure. The memory 180 may include RAM, ROM, and/or other persistent, auxiliary, or non-transitory computer-readable media. The memory 180 may store an operating system 182 that provides computer program instructions for use by the processor 190 in the general administration and operation of the computing system 700. The memory 180 may further include computer program instructions and other information for implementing one or more aspects of the present disclosure. For example, in one embodiment, the memory 180 includes a user interface module 184 that generates user interfaces (and/or instructions therefor) for display upon a user computing device (e.g., user computing device 102 of FIG. 1), e.g., via a navigation and/or browsing interface such as a browser or application installed on the user computing device. In addition, the memory 180 may include or communicate with one or more data stores.

In addition to and/or in combination with the user interface module 184, the memory 180 may include an image optimization management module 186 that may be executed by the processor 190. In one embodiment, the image optimization management module 186 implements various aspects of the present disclosure, e.g., those illustrated in FIGS. 1-6 or described with reference to FIGS. 1-6.

Although a single processor, a single network interface, a single computer-readable medium, and a single memory are illustrated in the example of FIG. 7, in other implementations, the computing system 700 can have a multiple of one or more of these components (e.g., two or more processors and/or two or more memories).

Example Implementations (EIs)

Some enumerated example implementations (EIs) are provided in this section, without limitation.

EI 1: A cloud provider system comprising: a set of clusters hosted on a plurality of physical machines, wherein each cluster in the set of clusters includes a virtual machine configured to perform tasks; a container registry service providing a plurality of image repositories, wherein each image repository of the plurality of image repositories is configured to at least store a plurality of container images including a plurality of container image layers and executable on the virtual machines of the set of clusters; and a container service comprising computer hardware, wherein the container service is configured to access the plurality of container images from the container registry service, wherein the container service is further configured to at least: receive a request to optimize a first container image, wherein the request indicates a first set of parameters usable to execute the first container image, and wherein the first container image contains a plurality of container image layers that each contain a plurality of files usable during the execution of the first container image; determine a second set of parameters usable to execute an inspector container image, wherein the inspector container image is configured to monitor access to the plurality of files in the plurality of container image layers of the first container image during the execution of the first container image, and wherein the second set of parameters identifies at least the first container image; cause the inspector container image to be executed using the second set of parameters; based at least in part on the execution of the inspector container image, identify a subset of unused files of the plurality of files in at least one container image layer of the plurality of container image layers of the first container image and a subset of used files of the plurality of files in the first container image; and output a report indicating at least the subset of unused files of the plurality of files in the at least one container image layer of the plurality of container image layers of the first container image.

EI 2: The cloud provider system of EI 1, wherein the container service is further configured to output a second container image that contains a new container image layer that is different from each of the plurality of container image layers of the first container image, wherein the second container image does not contain the subset of unused files in the first container image.

EI 3: The cloud provider system of EI 1, wherein the container service is further configured to: cause the second container image to be executed; and confirm that a result of the execution of the second container image matches that of the execution of the first container image and that the execution of the second container image does not result in any errors.

EI 4: The cloud provider system of EI 1, wherein the container service is further configured to: receive a request to perform a code replacement on the subset of used files; determine that a first file in the subset of used files is associated with a second file that is not in the subset of used files but is associated with a performance improvement over the first file; and cause the second file to be included in the second container image instead of the first file.

EI 5: A computer-implemented method comprising: receiving a request to inspect a first container image, wherein the request indicates a first set of parameters usable to execute the first container image, and wherein the first container image contains a plurality of files usable during the execution of the first container image; determining a second set of parameters usable to execute an inspector container image, wherein the inspector container image is configured to monitor access to the plurality of files in the first container image during the execution of the first container image; executing the inspector container image using the second set of parameters; identifying (i) at least one unused file of the plurality of files in the first container image that was unused during the execution of the inspector container image, and (ii) a subset of remaining files of the plurality of files in the first container image that were used during the execution of the inspector container image; and outputting an indication of the at least one unused file of the plurality of files in the first container image.

EI 6: The computer-implemented method of EI 5, further comprising executing the second container image and determining that a result of the execution of the second container image matches that of the execution of the first container image.

EI 7: The computer-implemented method of EI 5, further comprising outputting a second container image that contains the subset of remaining files but not the at least one unused file.

EI 8: The computer-implemented method of EI 5, further comprising: determining that a first file in the subset of remaining files is associated with a second file that is not in the subset of remaining files but is usable to replace the first file; and including the second file in the second container image instead of the first file.

EI 9: The computer-implemented method of EI 8, wherein the association between the first file and the second file is provided in a mapping table mapping each original file included in the mapping table to a replacement file that is usable to replace the original file in a container image to improve execution performance of the container image.

EI 10: The computer-implemented method of EI 5, further comprising: determining an operating system associated with the first container image; and selecting, based at least in part on the inspector container image being associated with the operating system, the inspector container image from a plurality of inspector container images.

EI 11: The computer-implemented method of EI 5, wherein a size of the first container image is greater than a size of the second container image.

EI 12: The computer-implemented method of EI 5, wherein the inspector container image is executed on one of a virtual machine instance, a bare-metal instance, a physical machine, a container, a node, an offload card, an IoT device, or on-premises compute capacity.

EI 13: A non-transitory computer readable medium storing instructions that, when executed by a computing system within a cloud provider network, cause the computing system to perform operations comprising: receiving a request to inspect a first container image, wherein the request indicates a first set of parameters usable to execute the first container image, and wherein the first container image contains a plurality of files usable during the execution of the first container image; determining a second set of parameters usable to execute an inspector container image, wherein the inspector container image is configured to monitor access to the plurality of files in the first container image during the execution of the first container image; executing the inspector container image using the second set of parameters; identifying (i) at least one unused file of the plurality of files in the first container image that was unused during the execution of the inspector container image, and (ii) a subset of remaining files of the plurality of files in the first container image that were used during the execution of the inspector container image; and outputting an indication of the at least one unused file of the plurality of files in the first container image.

EI 14: The non-transitory computer readable medium of EI 13, storing further instructions that, when executed by the computing system, cause the computing system to perform operations comprising executing the second container image and determining that a result of the execution of the second container image matches that of the execution of the first container image.

EI 15: The non-transitory computer readable medium of EI 13, storing further instructions that, when executed by the computing system, cause the computing system to perform operations comprising outputting a second container image that contains the subset of remaining files but not the at least one unused file.

EI 16: The non-transitory computer readable medium of EI 13, storing further instructions that, when executed by the computing system, cause the computing system to perform operations comprising: determining that a first file in the subset of remaining files is associated with a second file that is not in the subset of remaining files but is usable to replace the first file; and including the second file in the second container image instead of the first file.

EI 17: The non-transitory computer readable medium of EI 13, wherein the association between the first file and the second file is provided in a mapping table mapping each original file included in the mapping table to a replacement file that is usable to replace the original file in a container image to improve execution performance of the container image.

EI 18: The non-transitory computer readable medium of EI 13, storing further instructions that, when executed by the computing system, cause the computing system to perform operations comprising: determining an operating system associated with the first container image; and selecting, based at least in part on the inspector container image being associated with the operating system, the inspector container image from a plurality of inspector container images.

EI 19: The non-transitory computer readable medium of EI 13, wherein a size of the first container image is greater than a size of the second container image.

EI 20: The non-transitory computer readable medium of EI 13, wherein the inspector container image is executed on one of a virtual machine instance, a bare-metal instance, a physical machine, a container, a node, an offload card, an IoT device, or on-premises compute capacity.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid-state memory chips or magnetic disks, into a different state. In some embodiments, the computer system may be a cloud-based computing system whose processing resources are shared by multiple distinct business entities or other users.

The processes described herein or illustrated in the figures of the present disclosure may begin in response to an event, such as on a predetermined or dynamically determined schedule, on demand when initiated by a user or system administrator, or in response to some other event. When such processes are initiated, a set of executable program instructions stored on one or more non-transitory computer-readable media (e.g., hard drive, flash memory, removable media, etc.) may be loaded into memory (e.g., RAM) of a server or other computing device. The executable instructions may then be executed by a hardware-based computer processor of the computing device. In some embodiments, such processes or portions thereof may be implemented on multiple computing devices and/or multiple processors, serially or in parallel.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein.

A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the scope of the disclosure. As can be recognized, certain embodiments described herein can be embodied within a form that does not provide all of the features and benefits set forth herein, as some features can be used or practiced separately from others. All changes which come within the meaning and range of equivalency of the claims are to be embraced within their scope.

What is claimed is:

1. A cloud provider system comprising:
a set of clusters hosted on a plurality of physical machines, wherein each cluster in the set of clusters includes a virtual machine configured to perform tasks;
a container registry service providing a plurality of image repositories, wherein each image repository of the plurality of image repositories is configured to at least store a plurality of container images including a plurality of container image layers and executable on the virtual machines of the set of clusters; and
a container service comprising computer hardware, wherein the container service is configured to access the plurality of container images from the container registry service,
wherein the container service is further configured to at least:
receive a request to optimize a first container image, wherein the request indicates a first set of parameters usable to execute the first container image, and wherein the first container image contains a plurality of container image layers that each contain a plurality of files usable during the execution of the first container image;
determine a second set of parameters usable to execute an inspector container image, wherein the inspector container image is configured to monitor access to the plurality of files in the plurality of container image layers of the first container image during the execution of the first container image, and wherein the second set of parameters identifies at least the first container image;
cause the inspector container image to be executed using the second set of parameters;
based at least in part on the execution of the inspector container image, identify a subset of unused files of the plurality of files in at least one container image layer of the plurality of container image layers of the first container image and a subset of used files of the plurality of files in the first container image; and
output a report indicating at least the subset of unused files of the plurality of files in the at least one container image layer of the plurality of container image layers of the first container image.

2. The cloud provider system of claim 1, wherein the container service is further configured to output a second container image that contains a new container image layer that is different from each of the plurality of container image layers of the first container image, wherein the second container image does not contain the subset of unused files in the first container image.

3. The cloud provider system of claim 1, wherein the container service is further configured to:
cause the second container image to be executed; and
confirm that a result of the execution of the second container image matches that of the execution of the first container image and that the execution of the second container image does not result in any errors.

4. The cloud provider system of claim 1, wherein the container service is further configured to:
receive a request to perform a code replacement on the subset of used files;
determine that a first file in the subset of used files is associated with a second file that is not in the subset of used files but is associated with a performance improvement over the first file; and
cause the second file to be included in the second container image instead of the first file.

5. A computer-implemented method comprising:
receiving a request to inspect a first container image, wherein the request indicates a first set of parameters usable to execute the first container image, and wherein the first container image contains a plurality of files usable during the execution of the first container image;
determining a second set of parameters usable to execute an inspector container image, wherein the inspector container image is configured to monitor access to the plurality of files in the first container image during the execution of the first container image;
executing the inspector container image using the second set of parameters;
identifying (i) at least one unused file of the plurality of files in the first container image that was unused during the execution of the inspector container image, and (ii) a subset of remaining files of the plurality of files in the first container image that were used during the execution of the inspector container image; and
outputting an indication of the at least one unused file of the plurality of files in the first container image.

6. The computer-implemented method of claim 5, further comprising executing the second container image and determining that a result of the execution of the second container image matches that of the execution of the first container image.

7. The computer-implemented method of claim 5, further comprising outputting a second container image that contains the subset of remaining files but not the at least one unused file.

8. The computer-implemented method of claim 5, further comprising:
   determining that a first file in the subset of remaining files is associated with a second file that is not in the subset of remaining files but is usable to replace the first file; and
   including the second file in the second container image instead of the first file.

9. The computer-implemented method of claim 8, wherein the association between the first file and the second file is provided in a mapping table mapping each original file included in the mapping table to a replacement file that is usable to replace the original file in a container image to improve execution performance of the container image.

10. The computer-implemented method of claim 5, further comprising:
   determining an operating system associated with the first container image; and
   selecting, based at least in part on the inspector container image being associated with the operating system, the inspector container image from a plurality of inspector container images.

11. The computer-implemented method of claim 5, wherein a size of the first container image is greater than a size of the second container image.

12. The computer-implemented method of claim 5, wherein the inspector container image is executed on one of a virtual machine instance, a bare-metal instance, a physical machine, a container, a node, an offload card, an IoT device, or on-premises compute capacity.

13. A non-transitory computer-readable medium storing instructions that, when executed by a computing system within a cloud provider network, cause the computing system to perform operations comprising:
   receiving a request to inspect a first container image, wherein the request indicates a first set of parameters usable to execute the first container image, and wherein the first container image contains a plurality of files usable during the execution of the first container image;
   determining a second set of parameters usable to execute an inspector container image, wherein the inspector container image is configured to monitor access to the plurality of files in the first container image during the execution of the first container image;
   executing the inspector container image using the second set of parameters;
   identifying (i) at least one unused file of the plurality of files in the first container image that was unused during the execution of the inspector container image, and (ii) a subset of remaining files of the plurality of files in the first container image that were used during the execution of the inspector container image; and
   outputting an indication of the at least one unused file of the plurality of files in the first container image.

14. The non-transitory computer-readable medium of claim 13, storing further instructions that, when executed by the computing system, cause the computing system to perform operations comprising executing the second container image and determining that a result of the execution of the second container image matches that of the execution of the first container image.

15. The non-transitory computer-readable medium of claim 13, storing further instructions that, when executed by the computing system, cause the computing system to perform operations comprising outputting a second container image that contains the subset of remaining files but not the at least one unused file.

16. The non-transitory computer-readable medium of claim 13, storing further instructions that, when executed by the computing system, cause the computing system to perform operations comprising:
   determining that a first file in the subset of remaining files is associated with a second file that is not in the subset of remaining files but is usable to replace the first file; and
   including the second file in the second container image instead of the first file.

17. The non-transitory computer-readable medium of claim 16, wherein the association between the first file and the second file is provided in a mapping table mapping each original file included in the mapping table to a replacement file that is usable to replace the original file in a container image to improve execution performance of the container image.

18. The non-transitory computer-readable medium of claim 13, storing further instructions that, when executed by the computing system, cause the computing system to perform operations comprising:
   determining an operating system associated with the first container image; and
   selecting, based at least in part on the inspector container image being associated with the operating system, the inspector container image from a plurality of inspector container images.

19. The non-transitory computer-readable medium of claim 13, wherein a size of the first container image is greater than a size of the second container image.

20. The non-transitory computer-readable medium of claim 13, wherein the inspector container image is executed on one of a virtual machine instance, a bare-metal instance, a physical machine, a container, a node, an offload card, an IoT device, or on-premises compute capacity.

* * * * *